United States Patent [19]

Meyer et al.

[11] 3,708,849
[45] Jan. 9, 1973

[54] AUTOMATED ROLLER CLUTCH ASSEMBLY

[75] Inventors: Howard M. Meyer, Ypsilanti; Mayo M. Reichardt, Milford, both of Mich.

[73] Assignee: General Motors Corporation, Detroit, Mich.

[22] Filed: July 26, 1971

[21] Appl. No.: 166,100

[52] U.S. Cl..................29/201, 29/208 F, 29/211 R, 29/227
[51] Int. Cl..........................B23p 19/04, B23q 7/10
[58] Field of Search.........29/201, 208 R, 208 F, 227, 29/211 R, 208 C

[56] References Cited

UNITED STATES PATENTS

2,255,626   9/1941   Ortegren et al. .........................29/201

Primary Examiner—Thomas H. Eager
Attorney—J. L. Carpenter et al.

[57] ABSTRACT

An apparatus for automatically assembling compressed springs and rollers into an overrunning roller clutch assembly comprises a pair of intermittently rotated plates pivoted on spaced parallel axes. One plate has a plurality of loading chambers with reciprocating slides which receives the rollers, combines them with springs, compresses the springs and delivers sets of compressed springs and rollers to a transfer hub carried by the second intermittently rotated plate. Upon one complete rotation of the plates, the transfer hub is loaded with a full complement of rollers and springs. The complement of springs and compressed roller sets are then transferred to a clutch race to provide the overrunning roller clutch assembly.

6 Claims, 9 Drawing Figures

Fig.1

INVENTORS.
Howard M. Meyer &
BY Mayo M. Reichardt

F.J. Fordale
ATTORNEY

AUTOMATED ROLLER CLUTCH ASSEMBLY

This invention relates generally to an assembly apparatus, and more specifically, to an apparatus for assembling a device having a number of circumferentially spaced compressible members which are assembled in their compressed state.

More particularly, this invention results from an effort to provide an apparatus for automatically assembling an overrunning roller clutch of the type which utilizes a plurality of circumferentially spaced rollers with individual tickler springs which constantly lightly load rollers toward an engaged position.

It is now the general practice in industry to either assemble such overrunning roller clutches manually, or in the alternative to use complicated assembly apparatus which does not have the speed, durability and low maintenance required of production equipment.

Broadly, the object of this invention is to provide a simple, speedy and efficient apparatus for automatically assembling a device having a plurality of circumferentially spaced compressible members which are assembled to the device in their compressed state.

Another object of this invention is to provide such an apparatus for simultaneously and automatically assembling a plurality of rollers and compressed springs into a clutch race while the springs are in their compressed state.

Another object of this invention is to provide such an apparatus in which the rollers and compressed springs are loaded into the transfer hub in a very short period of time, and in which a complete complement of rollers and compressed springs are simultaneously transferred to a clutch race to provide a roller clutch assembly.

Another object of this invention is to provide such an apparatus of simple design and having a minimum of moving parts.

Another object of this invention is to provide such an apparatus in which a loader mechanism uses an intermittent rotary motion to receive springs and compress them.

Another object of this invention is to provide an automatic assembly apparatus using a simple intermittent rotary motion for the speedy collection of a complement of rollers and compressed springs which are transferred to a clutch race to provide an overrunning roller clutch assembly.

The exact nature of this invention as well as other objects and advantages thereof will be readily apparent from consideration of the following specification relating to the annexed drawings in which.

Figure 1:
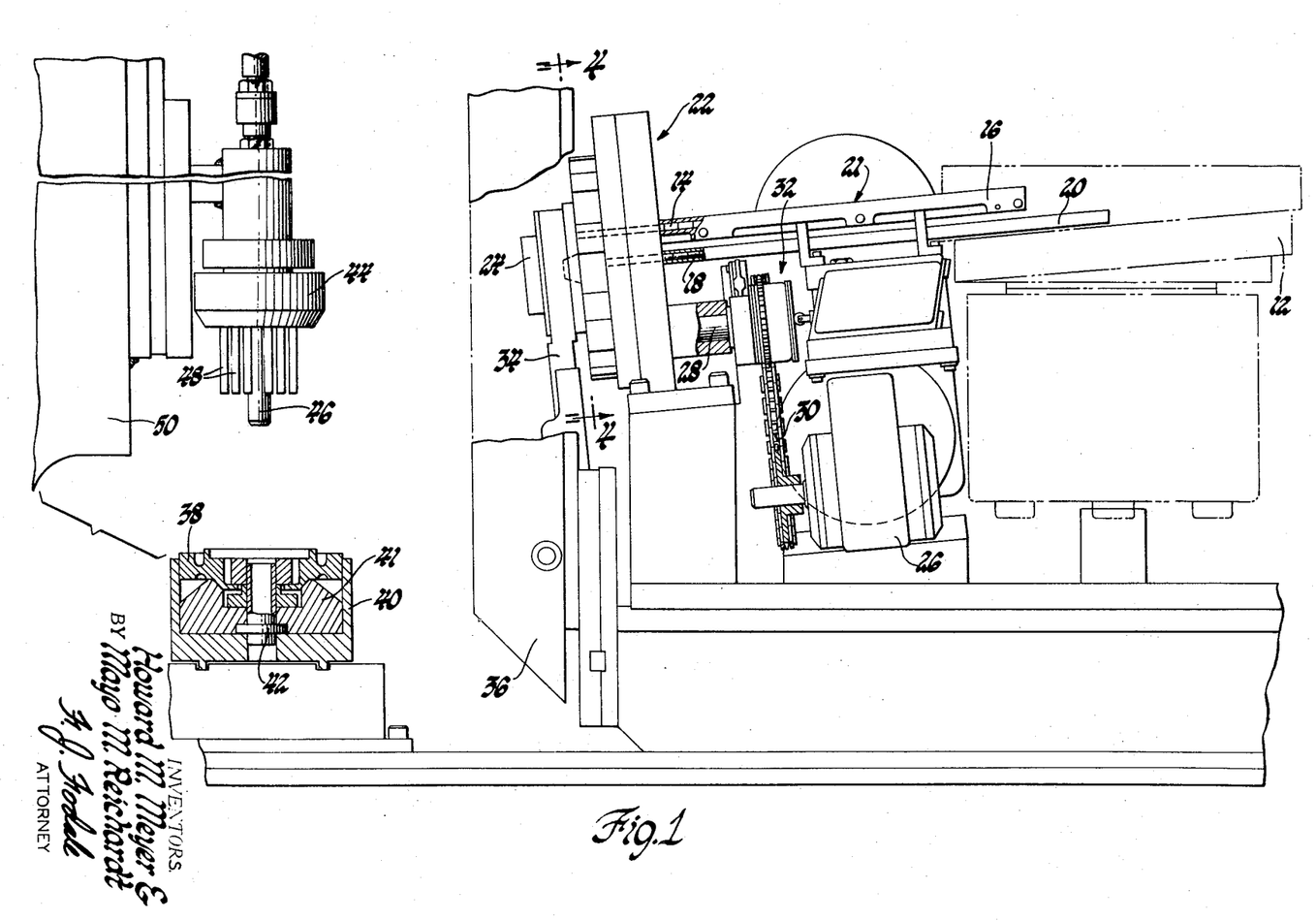
FIG. 1 is an elevation view of an assembly apparatus for assembling an overrunning roller clutch embodying the principles of this invention.

Referring now to the drawings and more specifically to FIG. 1, there is shown an apparatus for assembling rollers and compressible accordion type springs into a roller clutch. The apparatus includes a pair of vibratory hoppers 12 which are indicated in phantom lines as the structural details of vibratory hoppers are well known and need not be described. Suffice it to say that one hopper delivers accordion type springs 14 to chute 16 inclined at about 5° while the other hopper delivers rollers 18 to delivery tube 20 also inclined at about 5° and located below the chute 16. The chute 16 and tube 20 are vertically aligned and supported by the same structure to comprise a dual feed track 21 for delivering springs and rollers individually to the loader mechanism indicated generally at 22. The loader mechanism 22 is the central feature of the assembly apparatus and will be described in detail later. At this point, it is sufficient to describe the function of the loader mechanism 22 which is to receive the springs 14 and rollers 18 individually from the dual track 21, combine them in pairs, compress the spring of each pair, and deliver pairs of rollers and compressed springs, one pair at a time, to a transfer hub 24 until it is completely loaded with a full complement of rollers and springs. In performing the above function, the loader mechanism 22 is intermittently rotated by an electric motor 26 which drives a driver 28 through a chain 30 and clutch-brake assembly 32. The clutch-brake assembly 32 is controlled by a sensing device (not shown) which interrupts power to and brakes the loader mechanism 22 should either springs or rollers fail to reach their designated areas in the loader mechanism 22. The sensing device, as well as other electrical controls, have been omitted since they may take many forms and suitable controls can be provided by a machine designer skilled in the art.

Figure 2:
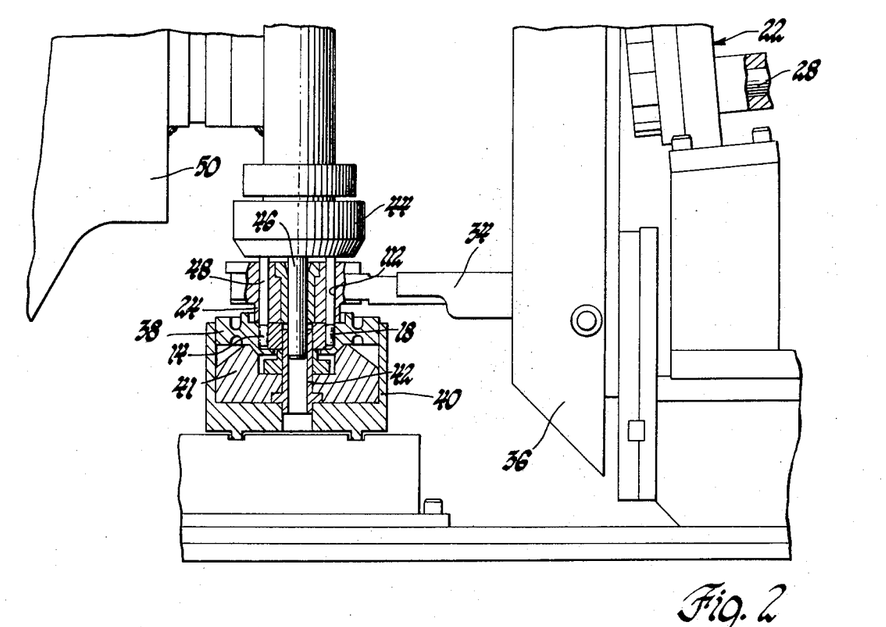
FIG. 2 is a portion of the assembly apparatus shown in FIG. 1 with various parts of the apparatus in a different operative position.

The transfer hub 24 which is a cooperative part of the loader mechanism 22 is secured to an arm 34 which is pivotally mounted on the framework 36 of the assembly apparatus. When the transfer hub is loaded with a complement of rollers and springs corresponding in number and spacing to those in the roller clutch being assembled, the arm 34 is pivoted downwardly from the vertical position shown in FIG. 1 to a horizontal position shown in FIG. 2 where it overlies a clutch outer race 38 carried by a slide 40. The slide 40 moves a series of races 38 in a horizontal direction, and thus includes a number of individual holders 41 with central pilot tubes 42 for bringing empty races into the apparatus and carrying away completed clutch assemblies. In the position shown in FIG. 2, the race 38 is held against the holder 41 by the transfer hub 24 in alignment with a ram head 44. The ram head 44 has a central pilot pin 46 and a plurality of circumferentially spaced probes 48. Upon actuation and descent of the ram 44 down the slide 50, the pilot pin 46 first enters the pilot tube 42 for centering the probes 48 with respect to the transfer hub 24. As the ram 44 further descends, the probes 48 enter the transfer hub 24 pushing the springs and rollers from the transfer hub into the race 38. FIG. 2 shows the ram head near the bottom of its descent with the springs and rollers being transferred to the race 38 by the probes 48.

Figure 3:
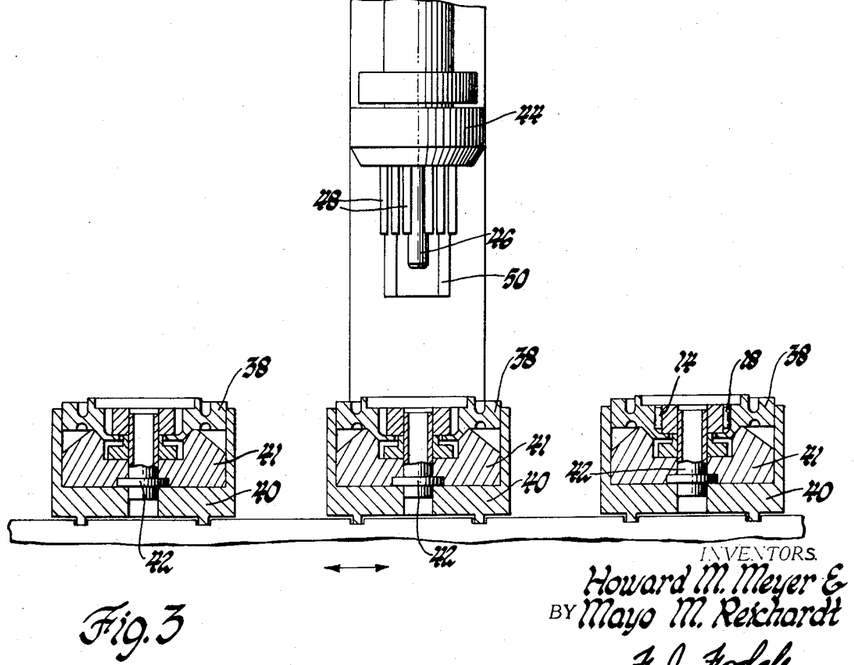
FIG. 3 is a front view of a portion of the apparatus shown in FIGS. 1 and 2.

Briefly summarizing, the operation of the apparatus is as follows. Loose rollers and springs are supplied separately to the hoppers 12 from which they are individually fed down the dual track 21 to the intermittently rotated loader mechanism 22. The loader mechanism 22 combines the springs and rollers, compresses the springs and delivers the rollers combined with compressed springs to the transfer hub 24. When a complete set of springs and compressed rollers are collected in the transfer hub 24, it is pivoted downwardly to the horizontal position shown in FIG. 2 at which time an outer clutch race 38 has been located below the transfer hub 24 by slide 40. The ram head 44 is then actuated and the probes 48 descend pushing the complete set of rollers and compressed springs from the transfer hub 24 to the outer clutch race 38 providing a complete assembly of outer race rollers and compressed springs. The ram head 44 is raised and the transfer hub 24 is pivoted back to the vertical portion shown in FIG. 1 for reloading with another complement of rollers and springs. While the transfer hub 24 is being reloaded, the completed clutch assembly is transferred out of the position shown in FIG. 2 by the slide 40 and an unloaded race is transferred into this position. See FIG. 3.

THE LOADER MECHANISM

Figures 4, 4A, 5:
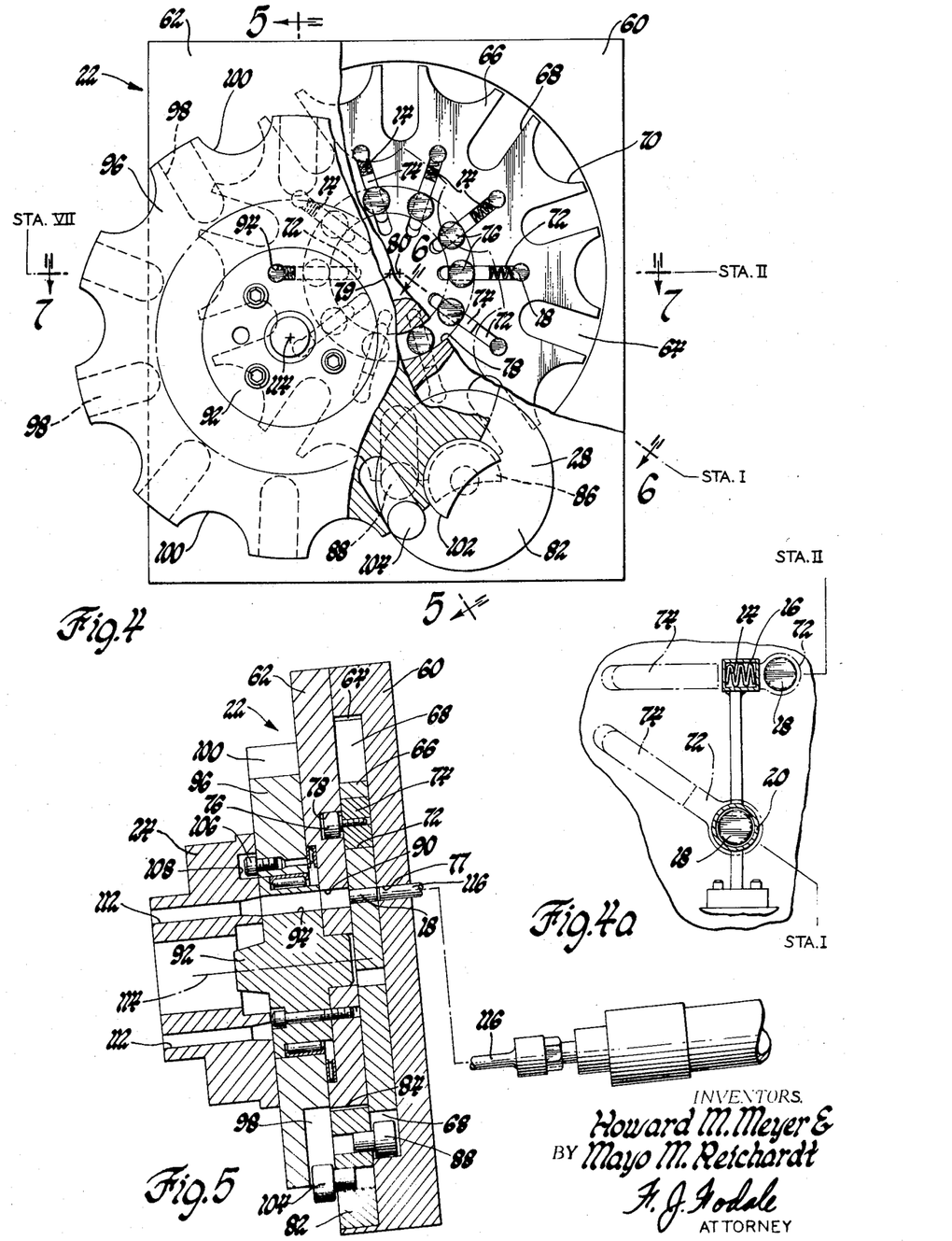
FIG. 4 is a view substantially along the line 4—4 of FIG. 1 showing the front view of the loader mechanism. The spring and roller loader shown in FIG. 4 is partially broken away and the transfer hub has been omitted to show various details of the mechanism.
FIG. 4a is a view of a portion of FIG. 4 with the loader mechanism in phantom to show the relationship of the dual track to the loader mechanism.
FIG. 5 is a view substantially along the line 5—5 of FIG. 4 and shows a vertical section through the loader mechanism.

The loader mechanism 22 which is a central feature of the assembly apparatus is best understood in relation to FIGS. 4 and 5. Briefly, the loader mechanism comprises offset geneva plates driven by a single driver. Loading chambers with reciprocating slides are provided in one plate to receive rollers and springs, combine them, compress the springs, and deliver the compressed springs and rollers to a transfer hub carried by the second geneva plate. The transfer hub collects a full complement of springs and rollers for subsequent transfer to a clutch race.

More specifically, the loader mechanism 22 comprises a housing 60 having a bi-lobed recess 64 closed by a cover 62 suitably secured to the housing 60. A first geneva plate 66 is journaled in the larger lobe of the recess 64 for rotation about an axis 80. The outer margin of the geneva plate 66 is provided with drive slots 68 interposed between locating recesses 70. A plurality of generally radial elongated loading chambers 72 comprising an inner flat walled portion and an outer cylindrical portion are provided in the geneva plate 66. Disposed in each of the flat wall portions is a slide 74 carrying a follower 76 which projects into a cam track 78 recessed into the cover 62. The cam track 78 is centered on axis 79 and is thus eccentric with respect to the axis of rotation 80 of the geneva plate 66 so that as the geneva plate 66 rotates, the slides 74 reciprocate in the loading chambers 72.

The driver 28 includes a central hub 82 journaled in a hole 84 in the lower portion of the cover 62. Immediately behind the hub 82 and projecting into the recess 64 is a first locator enlargement 86 integrally incorporated into the driver 28. A first drive pin 88 is mounted on the hub 82 and cooperates with the drive slots 68 on the geneva plate 66 to rotate it intermittently. As the driver 28 rotates, the drive pin 88 enters a drive slot 68 as shown in FIG. 4 and rotates the geneva plate 66 approximately 36° until the drive pin 88 exits the drive slot after some 180° of rotation of the driver 28. For the next 180° of driver rotation, the geneva plate dwells and is stabilized in its dwell position by the locator enlargement 86 cooperating with one of the recesses 70. The geneva plate then is driven with intermittent rotary motions separated by dwell periods in response to continuous rotation of the driver 28. During successive dwell periods of the geneva plate 66, each of the loading chambers 72 is progressively indexed through a plurality of circumferentially spaced stations where the geneva plate 66 is positively located by the locator enlargement 86. Stations I, II, VII are indicated in FIG. 4.

As the geneva plate is intermittently rotated, the slides 74 reciprocate in the loading chambers 72, and it is to be noted that the slide 74 is at its most radially inward position at station II and in its most radially outward position at station VII. The reason for this feature will be more fully explained hereafter.

The cover 62 includes a keyhole 90 extending through it which aligns with the cylindrical portion and a part of the flat walled portion of a loading chamber 72 when that particular loading chamber is positioned at station VII. A pilot mount 92 secured to the cover 62 also includes a keyhole 94 aligned with the keyhole 90 at station VII. Journaled on the pilot mount 92 is a second geneva plate 96 which like the first geneva plate has drive grooves 98 alternated with recesses 100. The drive grooves 98 cooperate with a second drive pin 104 on the driver 28 to impart intermittent rotary motion to the second geneva plate 96, and the recesses 100 cooperate with a second locator enlargement 102 integrated with the driver 28 to precisely locate the second geneva plate 96 during its dwell periods. It is important to note that both geneva plates are driven from and precisely located during the dwell periods by a single driver 28, thus automatically providing for synchronization between the motions of the two geneva plates.

The second geneva plate 96 provides for the collecting and storing a full complement of compressed springs and rollers which are received in sets from the first geneva plate 66 which functions as a loader for the collector. In performing the collecting and storing function, the second geneva plate 96 cooperates with the transfer hub 24 which has a plurality of circumferentially spaced keyholes 112 corresponding in number and spacing to that of the roller clutch into which they are to be assembled. In one of its operative positions (shown in FIGS. 1 and 5), the transfer hub 24 is adjacent the face of the second geneva drive 96. The transfer hub 24 is centered on and rotated with the second geneva plate 96 by the pilot drive pin 106 disposed in the pilot hole 108 of the transfer hub 24. The intermittent rotation of the second geneva plate 96 and transfer hub 24 is about the pilot mount axis 114 which is spaced from and parallel to the axis of rotation 80 of the first geneva plate 62. The transfer hub 24 is so oriented on the second geneva plate 96 and the axes 80 and 114 so spaced that one of such transfer hub keyholes 112 aligns with the keyholes 90 and 94 and one of the loading chambers 72 during each dwell period of the geneva plates 66 and 96. FIGS. 4 and 5 show the alignment which occurs in this particular apparatus at station VII.

As shown in FIG. 5, the assembly apparatus includes a fluid motor driven push rod 116, the stationary portion of which is mounted on framework of the assembly apparatus. The framework has been omitted for clarity as has the controls for operating the push rod. The pertinence of the push rod 116 lies in its function which is described hereafter.

Another relationship between the loader mechanism 22 and the other assembly apparatus structure is shown in FIG. 4a. This figure shows the vertical alignment of the chute 16 and tube 20 (of the dual track 21) and their disposition behind two adjacent loading chambers located at stations I and II respectively. More specifically, the tube 20 is aligned with the cylindrical portion of the loading chamber 72 at station I for the loading of rollers therein to. The chute 16 is aligned with the flat wall portion of the loading chamber 72 (immediately adjacent to the cylindrical portion) at station II where the slide 74 is at its most radially inward position and thus adapted to receive a non-compressed spring between the slide 74 and a roller disposed in the chamber.

Figure 6:
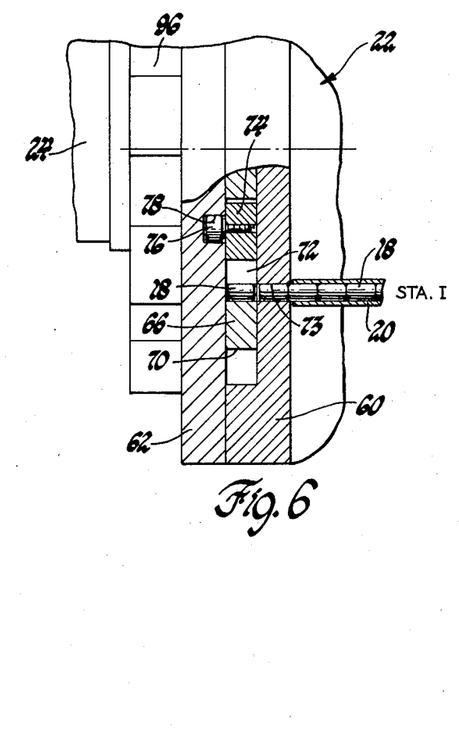
FIG. 6 is a view substantially along the line 6—6 of FIG. 4 to illustrate the detail of the loader mechanism in the area where rollers are fed into the mechanism.

FIG. 6 shows the relation of the tube 20 to the loader mechanism 22 from another view, and illustrates a roller 18 being loaded into the loading chamber 72 from the tube 20 at station I.

Figure 7:
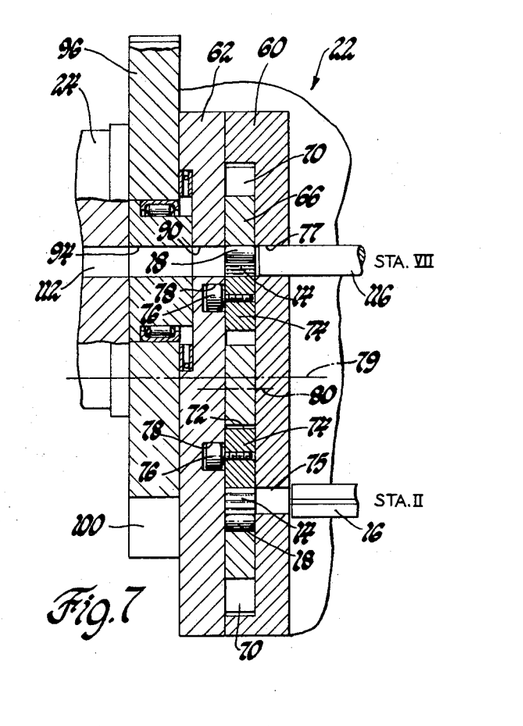
FIG. 7 is a horizontal section substantially along the line 7—7 of FIG. 4 to illustrate the detail of the loader mechanism in the areas where springs are fed into the mechanism and where rollers and compressed springs are transferred into a transfer hub.

FIG. 7 shows the relationship of the chute 16 to the loader mechanism 22 from another view and illustrates a spring 14 being loaded into a loading chamber 72 at station II. At station II, the slide 74 is at its most radially inward position so that the non-compressed spring is easily loaded into the flat walled portion of the loading chamber immediately adjacent the cylindrical portion which holds a roller 18 previously loaded into the chamber 72 at station I.

FIG. 7 also illustrates the loader and other assembly apparatus structure at station VII which is located diametrically opposite station II. The slide 74 in the chamber at station VII is in its most radially outward position compressing the spring 14 against the roller 18 both of which are aligned with the push rod 116, keyholes 90 and 94, and a transfer hub keyhole 112. At station VII these elements (roller and compressed spring) are pushed into a transfer hub keyhole by the push rod 116.

Figure 8:
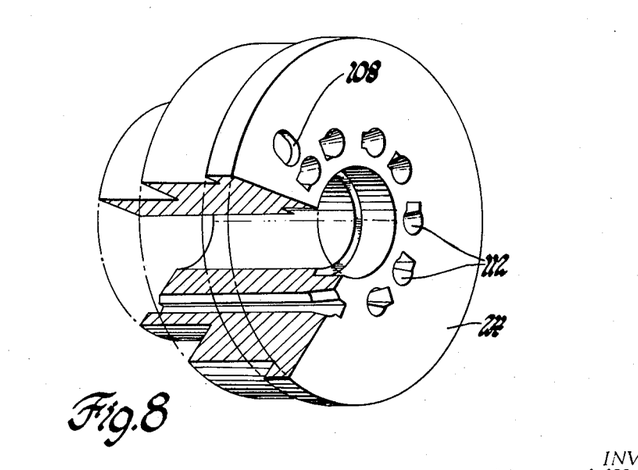
FIG. 8 is a perspective view partially sectioned of the transfer hub.

FIG. 8 is a perspective view of the transfer hub 24 showing its circumferentially spaced array of keyholes 112 which extend axially through it.

DETAILED DESCRIPTION OF THE OPERATION

The operation of the subject assembly apparatus for simultaneously and automatically assembling a plurality of rollers and springs to a clutch race is as follows. Loose rollers and unstressed springs from the two hoppers 12 fill the tube 20 and chute 16. See FIG. 1. The tube 20 and chute 16 being inclined and vibrated, feed the rollers and springs to the loader mechanism 22. The motor 26 is activated continuously rotating the driver 28 through the chain 30 and brake-clutch assembly 32. The first geneva drive plate 66, however, is only intermittently rotated with intermediate dwell periods during which it is stationary. During a dwell period, a roller is fed into the loading chamber 72 through an opening 73 in the housing 60 located at station I. See FIGS. 4 and 6. After the driver 28 rotates approximately 180° clockwise from the position shown in FIG. 4, the loading chamber 72 with the roller 18 in it will have been moved to station II. During the next dwell period, an unstressed spring 14 is fed into the chamber 72 through the opening 75 by the chute 16. See FIGS. 4, 4a and 7. During the subsequent intermittent rotation of the geneva plate through stations III, IV, V and VI (not indicated), the spring 14 is progressively compressed by the slide 74 moving radially outwardly in the chamber 72 through action of the follower 74 disposed in the eccentric cam track 76. When the chamber 72 reaches station VII, the spring 14 is in its most compressed state, and during the dwell period at this station VII, the push rod 116 is extended through the housing opening 77 into the chamber 72 pushing the roller and compressed spring through the aligned keyholes 90 and 94 and into one of the keyholes 112 in the transfer hub 24. See FIG. 7. The push rod is then withdrawn and the first geneva plate 66 is further intermittently indexed until the emptied chamber 72 progresses through stations VIII, IX and X (not indicated) returns to station I to repeat the cycle. While the above described action considered only what was occurring in a single chamber as it progressed through the ten circumferentially spaced stations, it is to be understood that these actions are simultaneously occurring in all of the chambers as they are all progressively indexed through the ten stations. In other words, during a single dwell period, a roller is being loaded into a chamber in station I, a spring is being loaded into another chamber 72 already containing a roller at station II, and a roller and a compressed spring are being pushed out of still another chamber at station VII. During the intermittent rotation, springs are progressively compressed between stations II and VII. Once the geneva plate 66 has been rotated 180°, a compressed spring and roller is pushed into the transfer hub 24 for every subsequent 36° of rotation of the geneva plate 66, which means that ten such combinations are delivered to the transfer hub 24 for every complete revolution of the geneva drive plate 66.

As the geneva drive plate 66 is rotated one complete revolution, so also is the transfer hub 24 rotated one complete revolution by the second geneva drive plate 96. The intermittent rotation of the transfer hub 24 serially presents each of the keyholes 112 to the station VII during successive dwell periods of the second geneva plate 96. The dwell periods of the second geneva plate 96 are synchronized with the dwell periods of the first geneva drive plate 66 and their proper keyholes and loading chamber aligned by the single driver 28 with its two drive pins and two locator enlargements.

After one complete revolution of the geneva drive plates 66 and 96, the transfer hub is loaded with ten sets of rollers and compressed springs. The brake-clutch assembly 32 is then actuated disengaging the driver 28 from the motor 26 and braking the geneva plates of the loader mechanism. See FIG. 1. The loaded transfer hub 24 is pivoted downwardly to the horizontal position shown in FIG. 2 where the transfer hub 24 overlies an outer clutch race 38 having ten circumferentially spaced ramp recesses for receipt of the ten sets of rollers and compressed springs in the transfer hub. The ram head 44 is then actuated descending from the position shown in FIG. 1 to the position shown in FIG. 2. The probes 48 carried by the ram head 44 enter the keyholes 112 in the transfer hub 24 and simultaneously push all ten sets of compressed springs and rollers into the outer clutch race 38 to provide a roller clutch assembly. The ram head is then raised to the position shown in FIGS. 1 and 3, the empty transfer hub 24 is pivoted back to the vertical position shown in FIG. 1, the completed clutch assembly is moved out from under the ram head 44 by the slide 40, and an empty clutch race 38 is brought under the ram head. While the slide 40 is transferring the clutch races, the transfer hub 24 is being reloaded by the loading mechanism 22.

With this apparatus, the cycle time for assembling a clutch having ten rollers and ten springs is approximately 15 seconds so that about 240 clutches can be assembled in 1 hour. The assembly rate can be further improved by utilizing two confronting loader mechanisms 22 in conjunction with a single transfer slide timed so that one loader mechanism is being loaded while the other loader mechanism is transferring rollers and compressed springs to a clutch race. It is also contemplated that the springs and rollers can be loaded directly into the clutch race thereby eliminating the transfer hub. Thus it can be seen that we have provided an automatic machine for loading compressed springs and rollers into a clutch outer race to provide the roller clutch assembly which is simple, speedy and efficient.

We wish it to be understood that we do not desire to be limited to the exact details of construction shown and described for obvious modifications will occur to a person skilled in the art.

We claim:

1. Apparatus for assembling a device which includes compressible members which are assembled into the device in a compressed state comprising:
   a loader rotatably mounted on a first axis,
   a plurality of radial elongated loading chambers in said loader,
   a slide disposed in each of said chambers,
   means to reciprocate said slides in said chambers in response to rotation of said loader,
   a collector rotatably mounted adjacent said loader on a second axis,
   a plurality of circumferentially spaced receiving cavities in said collector,
   said loader and said collector being so spaced with respect to each other and their respective chambers and cavities being so located radially therein respectively such that a cavity aligns with a chamber at one angular position of said chamber and said cavity respectively, and
   drive means to intermittently rotate said loader and said receiver in synchronization such that one of said chambers aligns with one of said cavities at said angular position during each dwell period between the intermittent rotation of said loader and said receiver.

2. Apparatus for assembling a device which includes compressible members which are assembled into the device in a compressed state comprising:
   a loader rotatably mounted on a first axis,
   a plurality of radial elongated loading chambers in said loader,
   means to intermittently rotate said loader so that each of said loading chambers is indexed to a plurality of circumferentially spaced stations,
   a slide disposed in each of said chambers,
   means to reciprocate each of said slides in its chamber in response to rotation of said loader,
   a collector rotatably mounted adjacent said loader on a second axis parallel to said first axis,
   a plurality of circumferentially spaced keyholes in said collector which open toward said loading chambers in a generally axial direction,
   said keyholes being so located in said collector such that they progressively align with a progression of said loading chambers in said loader at one of said stations, and
   second drive means to intermittently rotate said collector in synchronization with said loader such that said keyholes are sequentially aligned with said loading chambers at said one station during subsequent swell periods between the synchronized intermittent rotation of said loader and said collector.

3.
   a first geneva plate rotatably mounted on a first axis,
   a driver indexing said first geneva plate past a plurality of circumferentially spaced stations, said stations including a spring receiving station and a transfer station diametrically opposite said spring receiving station,
   a plurality of radial elongated loading chambers in said first geneva plate at locations corresponding to said stations,
   a slide disposed in each of said chambers,
   means to reciprocate each of said slides in its chamber in response to the indexing of said first geneva plate, said slides being reciprocated from a radially inward position at said spring receiving station to a radially outward position at said transfer station,
   a second geneva plate rotatably mounted on a second axis spaced from and parallel to said first axis, and
   a collector having a plurality of spaced keyholes detachably secured to said second geneva plate, and
   said driver intermittently rotating said second geneva plate in synchronization with said first geneva plate such that a keyhole is located at said transfer station during each dwell period of said geneva plates.

4. Automated apparatus for assembling a complement of rollers and compressed springs into a roller clutch comprising:
   a housing having a roller feed hole and a spring feed hole,
   a first geneva plate rotatably mounted in said housing on a first axis, a plurality of radial elongated loading chambers extending axially through said loader, drive means to intermittently rotate said first geneva plate about said first axis so that each of said chambers dwell at a plurality of circumferentially spaced stations, said roller and feedholes being located at two of said stations, a cover secured to said housing, a transfer keyhole in said cover located at a third of said stations, a circular cam track in said cover eccentric with respect to said first axis, a slide disposed in each of said chambers, a follower carried by each of said slides and disposed in said circular cam track, a second geneva plate journaled on said cover for rotation about a second axis spaced from and parallel to said first axis, a transfer hub detachably secured to said second geneva plate, and a plurality of circumferentially spaced keyholes in said transfer hub alignable with said transfer keyhole, said driver intermittently rotating said second geneva plate receiver in synchronization with said first geneva plate such that a keyhole in said transfer hub and a chamber in said first geneva plate aligns with said transfer keyhole during each dwell period of said geneva plates.

5. Apparatus for automatically assembling a device including a plurality of springs assembled in a compressed state comprising:

a first geneva plate rotatably mounted on a first generally horizontal axis, a driver indexing said first geneva plate through a plurality of circumferentially spaced stations, said stations including a spring receiving station and a transfer station diametrically opposite said spring receiving station, means to feed unstressed springs to said first geneva plate at said spring receiving station, a plurality of radial elongated loading chambers in said first geneva plate at locations corresponding to said stations, a slide disposed in each of said chambers, means to reciprocate each of said slides in its chamber in response to the indexing of said first geneva plate, said slides being reciprocated from a radially inward position at said spring receiving station to a radially outward position at said transfer station whereby said unstressed spring which is received at said spring receiving station is progressively compressed until it reaches said transfer station, a second geneva plate rotatably mounted on a second axis spaced from and parallel to said first axis, a transfer hub having a plurality of spaced keyholes journaled on a pivotally mounted arm, means to pivot said arm between a generally vertical position where said transfer hub is located adjacent said second geneva plate and a second generally horizontal position, means forming a driving connection between said transfer hub and said second geneva plate when said transfer hub is in said generally vertical position, and said driver intermittently rotating said second geneva plate in synchronization with said first geneva plate such that a keyhole in said transfer hub is located at said transfer station during each dwell period of said geneva plates.

6. Automated apparatus for assembling a complement of rollers and compressed springs into a roller clutch comprising:

a generally vertical housing having a roller feed hole and a spring feed hole substantially vertically aligned therein, inclined track means for delivering rollers and springs to said holes respectively, a first geneva plate rotatably mounted in said housing on a generally horizontal axis, a plurality of radial elongated loading chambers extending axially through said loader, drive means indexing said first geneva plate about said axis so that each of said loading chambers dwell at a plurality of circumferentially spaced stations, said roller and feed holes being located at two adjacent stations whereby rollers and springs are progressively fed into each of said loading chambers as they pass said two stations, a cover secured to said housing, a transfer keyhole in said cover located at a third station diametrically opposite said station at which said spring feed hole is located, a circular cam track in said cover, a slide disposed in each of said chambers, a follower carried by each of said slides and disposed in said circular cam track, said circular cam track having a center offset toward said third station whereby springs disposed in said loading chambers are progressively compressed as said loading chambers are indexed to said third station, a second geneva plate journaled on said cover for rotation about a second axis spaced from and parallel to said first axis, a transfer hub movable between a first position where it is drivingly secured to said second geneva plate and a second position, a plurality of circumferentially spaced keyholes in said transfer hub alignable with said transfer keyhole, said driver intermittently rotating said second geneva plate receiver in synchronization with said first geneva plate such that said keyholes in said transfer hub are sequentially aligned with said loading chambers in said first geneva plate at said third station during each dwell period of said geneva plates, push rod means to transfer compressed springs and rollers from said loading chambers to said keyholes at said third station, and means to move said transfer hub from said first position to said second position whereby a complement of compressed springs and rollers in a loaded transfer hub may be simultaneously transferred to a clutch race.

* * * * *

PO-1050
(5/69)

UNITED STATES PATENT OFFICE
CERTIFICATE OF CORRECTION

Patent No. 3,708,849     Dated January 9, 1973

Inventor(s) Howard M. Meyer, Mayo M. Reichardt

It is certified that error appears in the above-identified patent and that said Letters Patent are hereby corrected as shown below:

Claim 2, column 8, line 30, delete "swell" and substitue -- dwell --.

Claim 3, column 8, insert the following as the beginning of claim 3:

-- Apparatus for automatically assembling a device including a plurality of springs assembled in a compressed state comprising: --

Claim 3, line 55, delete "and".

Signed and sealed this 29th day of May 1973.

(SEAL)
Attest:

EDWARD M. FLETCHER, JR.
Attesting Officer

ROBERT GOTTSCHALK
Commissioner of Patents